(12) United States Patent
Kawato et al.

(10) Patent No.: US 11,248,150 B2
(45) Date of Patent: Feb. 15, 2022

(54) ADHESIVE, ADHESIVE RESIN COMPOSITION AND LAMINATE COMPRISING IT

(71) Applicant: TOSOH CORPORATION, Yamaguchi-ken (JP)

(72) Inventors: Daisuke Kawato, Yokkaichi (JP); Midori Takayama, Yokkaichi (JP); Makoto Oodake, Yokkaichi (JP); Shingo Kouda, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 210 days.

(21) Appl. No.: 16/302,329

(22) PCT Filed: May 17, 2017

(86) PCT No.: PCT/JP2017/018456
§ 371 (c)(1),
(2) Date: Nov. 16, 2018

(87) PCT Pub. No.: WO2017/199985
PCT Pub. Date: Nov. 23, 2017

(65) Prior Publication Data
US 2019/0300763 A1   Oct. 3, 2019

(30) Foreign Application Priority Data

May 19, 2016 (JP) .............................. JP2016-100425
Mar. 3, 2017 (JP) .............................. JP2017-040422
Mar. 6, 2017 (JP) .............................. JP2017-041726
May 17, 2017 (WO) .................. PCT/JP2017/018456

(51) Int. Cl.
| | |
|---|---|
| *B32B 7/12* | (2006.01) |
| *C09J 151/00* | (2006.01) |
| *B32B 27/08* | (2006.01) |
| *B32B 27/30* | (2006.01) |
| *B32B 27/32* | (2006.01) |
| *C08J 5/12* | (2006.01) |
| *C09J 123/06* | (2006.01) |
| *C09J 123/08* | (2006.01) |
| *C09J 129/06* | (2006.01) |
| *B32B 27/28* | (2006.01) |
| *C09J 201/00* | (2006.01) |
| *C09J 131/00* | (2006.01) |
| *B32B 27/00* | (2006.01) |
| *C09J 133/04* | (2006.01) |

(52) U.S. Cl.
CPC .............. *C09J 151/003* (2013.01); *B32B 7/12* (2013.01); *B32B 27/00* (2013.01); *B32B 27/08* (2013.01); *B32B 27/28* (2013.01); *B32B 27/306* (2013.01); *B32B 27/32* (2013.01); *C08J 5/128* (2013.01); *C09J 123/06* (2013.01); *C09J 123/08* (2013.01); *C09J 123/0846* (2013.01); *C09J 129/06* (2013.01); *C09J 131/00* (2013.01); *C09J 133/04* (2013.01); *C09J 151/00* (2013.01); *C09J 201/00* (2013.01); *C08J 2323/06* (2013.01); *C08J 2323/08* (2013.01); *C08J 2329/06* (2013.01); *C08J 2451/06* (2013.01)

(58) Field of Classification Search
CPC ......... B32B 27/00; B32B 27/08; B32B 27/12; B32B 27/28; B32B 27/306; B32B 27/32; B32B 7/12; C08F 299/00; C08J 2323/06; C08J 2323/08; C08J 2329/06; C08J 2451/06; C08J 5/128; C09J 123/06; C09J 123/08; C09J 123/0846; C09J 129/06; C09J 131/00; C09J 133/04; C09J 151/00; C09J 151/003; C09J 201/00
See application file for complete search history.

(56) References Cited

U.S. PATENT DOCUMENTS

| | | | | |
|---|---|---|---|---|
| 4,775,719 | A | * 10/1988 | Markevka | ............... C08L 31/00 525/125 |
| 2004/0186215 | A1 | * 9/2004 | Lewtas | ............... C09J 151/006 524/487 |

FOREIGN PATENT DOCUMENTS

| | | |
|---|---|---|
| JP | 56-103234 A | 8/1981 |
| JP | 59-75915 A | 4/1984 |
| JP | 61-270155 A | 11/1986 |
| JP | 62-158043 A | 7/1987 |
| JP | 7-108655 A | 4/1995 |

OTHER PUBLICATIONS

International Search Report for PCT/JP2017/018456 dated Jun. 20, 2017 [PCT/ISA/210].
International Preliminary Report on Patentability with a Translation of Written Opinion issued from the International Bureau in counterpart International Application No. PCT/JP2017/018456, dated Nov. 20, 2018.

* cited by examiner

*Primary Examiner* — Lawrence D Ferguson
(74) *Attorney, Agent, or Firm* — Sughrue Mion, PLLC

(57) ABSTRACT

To provide an adhesive excellent in adhesion to a thermoplastic resin and an ethylene/vinyl alcohol copolymer.
An adhesive comprising a hydrolyzate of a resin composition containing a thermoplastic resin (A), a copolymer (B) of ethylene and a vinyl ester and/or an acrylic acid ester having a vinyl ester and/or acrylic acid ester content higher by at least 5 mol % than (A); and a modified product having (A) grafted by (B), and an adhesive resin composition comprising it.

18 Claims, No Drawings

ADHESIVE, ADHESIVE RESIN COMPOSITION AND LAMINATE COMPRISING IT

CROSS REFERENCE TO RELATED APPLICATIONS

This application is a National Stage of International Application No. PCT/JP2017/18456, filed on May 17, 2017, which claims priority from Japanese Patent Application No. 2016-100425, filed on May 19, 2016, Japanese Patent Application No. 2017-040422, filed on Mar. 3, 2017, and Japanese Patent Application No. 2017-041726, filed on Mar. 6, 2017.

TECHNICAL FIELD

The present invention relates to an adhesive comprising a hydrolyzate of a resin composition containing a thermoplastic resin (A), a copolymer (B) of ethylene and a vinyl ester and/or an acrylic acid ester having a vinyl ester and/or acrylic acid ester content higher by at least 5 mol % than (A), and a modified product having (A) grafted by (B), and an adhesive resin composition comprising it. It further relates to a laminate having at least one layer formed from such an adhesive or adhesive resin composition.

BACKGROUND ART

A packaging material made from a thermoplastic resin for food, beverages, pharmaceutical preparations, etc., for the purpose of preventing deterioration of the content, an ethylene/vinyl alcohol copolymer (hereinafter sometimes referred to simply as EVOH) excellent in gas barrier property, aroma retention, solvent resistance, etc. has been widely used. However, since EVOH is hydrophilic and its gas barrier property, etc, decrease by moisture absorption, it is known to be commonly used as an interlayer of a laminate with e.g. a polyolefin excellent in water resistance such as polyethylene or polypropylene.

Since EVOH has a large number of hydroxy groups in its molecule, its affinity to e.g. a thermoplastic resin having no polar group such as polyethylene or polypropylene is very low, and these two are commonly not bonded to each other. Accordingly, use of a graft-modified ethylenic resin composition (for example, Patent Documents 1 and 2) grafted by an unsaturated carboxylic acid or its derivative or an ethylene/vinyl acetate copolymer hydrolyzate (for example, Patent Document 3) as an adhesive for EVOH which can hardly be bonded to polyolefin has been known.

The former graft-modified ethylenic resin composition grafted by an unsaturated carboxylic acid or its derivative has excellent adhesion, however, since it has high reactivity with EVOH, if it is kneaded repeatedly, the resin which stays in an extruder or a die will have an increased viscosity and be colored and gelled, and as a result, fish eyes and gel substances are present in a large amount in a product, thus lowering the quality of the product.

On the other hand, the latter ethylene/vinyl acetate copolymer hydrolyzate will not be colored or gelled by repeated kneading, and by adding an adhesive resin to the ethylene/vinyl acetate copolymer hydrolyzate, the adhesion to EVOH will improve, however, its effect is small, and EVOH may be peeled when it receives a small impact or friction when transported or used in many cases, and no sufficient adhesion could be obtained.

Under these circumstances, an adhesive which has excellent adhesion and which can be repeatedly reused has been desired.

PRIOR ART DOCUMENTS

Patent Documents

Patent Document 1: JP-A-S61-270155
Patent Document 2: JP-A-S62-158043
Patent Document 3: JP-A-H7-108655

DISCLOSURE OF INVENTION

Technical Problem

Under these circumstances, it is an object of the present invention to provide an adhesive excellent in adhesion to a thermoplastic resin such as polyethylene or polypropylene and EVOH, and a laminate comprising it.

Solution to Problem

The above object is achieved by an adhesive comprising a hydrolyzate of a resin composition containing a thermoplastic resin (A), a copolymer (B) of ethylene and a vinyl ester and/or an acrylic acid ester having a vinyl ester and/or acrylic acid ester content higher by at least 5 mol % than (A), and a modified product having (A) grafted by (B).

That is, the present invention provides the following [1] to [18].

[1] An adhesive comprising a hydrolyzate of a resin composition containing a thermoplastic resin (A), a copolymer (B) of ethylene and a vinyl ester and/or an acrylic acid ester having a vinyl ester and/or acrylic acid ester content higher by at least 5 mol % than (A), and a modified product having (A) grafted by (B).

[2] The adhesive according to [1], wherein the dispersed particle size of the resin containing (A) or (B) is from 0.01 to 50 μm.

[3] The adhesive according to [1] or [2], wherein the thermoplastic resin (A) contains at least one member of a homopolymer and a copolymer of a 02-12 α-olefin.

[4] The adhesive according to any one of [1] to [3], wherein the thermoplastic resin (A) contains at least one copolymer of ethylene and a vinyl ester and/or an acrylic acid ester having a vinyl ester and/or acrylic acid ester content lower by at least 5 mol % than the copolymer (B) of ethylene and a vinyl ester and/or an acrylic acid ester.

[5] The adhesive according to any one of [1] to [4], wherein the copolymer (B) of ethylene and a vinyl ester and/or an acrylic acid ester has a vinyl ester and/or acrylic acid ester content of from 5 to 35 mol %.

[6] The adhesive according to any one of [1] to [5], which contains a crosslinking agent (C).

[7] The adhesive according to any one of [1] to [6], which has a vinyl alcohol content of from 0.5 to 40 mol % and a vinyl ester and/or acrylic acid ester content of at most 30 mol %

[8] An adhesive resin composition comprising the adhesive as defined in any one of [1] to [7] and a polyvinyl alcohol and/or ethylene/vinyl alcohol copolymer which satisfies the following requirement (1):
(1) an ethylene content of at most 55 mol %,

[9] An adhesive resin composition comprising the adhesive as defined in any one of [1] to [7] and a polyolefin.

[10] A laminate comprising a layer formed from the adhesive as defined in any one of [1] to [7] or the adhesive resin composition as defined in [8] or 9, and at least one layer formed from another material.

[11] The laminate according to [10], wherein another material is an ethylene/vinyl alcohol copolymer.

[12] The laminate according to [10], wherein another material is a thermoplastic resin (A):

[13] A laminate comprising a layer containing an ethylene/vinyl alcohol copolymer, a layer formed from the adhesive as defined in any one of [1] to [7] or the adhesive resin composition as defined in [8] or [9], and a layer containing a thermoplastic resin (A), laminated in this order.

[14] A laminate comprising a layer formed from the adhesive resin composition as defined in [8] and a layer containing a polyolefin laminated on both sides of the above layer.

[15] A laminate comprising a layer containing a polyvinyl alcohol and/or ethylene/vinyl alcohol copolymer and a layer containing the adhesive resin composition as defined in [9] laminated on both sides of the above layer.

[16] A blow molded product comprising the laminate as defined in any one of [10] to [15].

[17] A sheet formed product comprising the laminate as defined in any one of [10] to [15]

[18] A film formed product comprising the laminate as defined in any one of [10] to [15], Now, the present invention will be described in detail.

The thermoplastic resin (A) of the present invention is a homopolymer or copolymer of a $C_{2-12}$ α-olefin such as ethylene, propylene or 1-butene, a copolymer of ethylene and a vinyl ester and/or an acrylic acid ester having a vinyl ester and/or acrylic acid ester content lower by at least 5 mol % than the copolymer (B) of ethylene and a vinyl ester and/or an acrylic acid ester, or polystyrene, a styrene polymer, polyvinyl chloride, polyester or polyamide.

It may, for example, be an ethylene-based polymer such as high pressure low density polyethylene, high density polyethylene, medium density polyethylene, an ethylene/1-butene copolymer, an ethylene/1-hexene copolymer, an ethylene/1-octene copolymer, an ethylene/4-methyl-1-pentene copolymer, an ethylene/vinyl acetate copolymer, an ethylene/acrylic acid ester copolymer or an ethylene/methacrylic acid ester copolymer, polypropylene, a propylene/ethylene copolymer, a propylene/1-butene copolymer, poly 1-butene, poly 1-hexene or poly 4-methyl-1-pentene, and the thermoplastic resin (A) may be used alone or in combination of two or more. Among them, preferred is high pressure low density polyethylene, high density polyethylene, an ethylene/1-butene copolymer, an ethylene/1-hexene copolymer or polypropylene, in view of the adhesion to a thermoplastic resin layer and the cost, and most preferred is a composition thereof, in view of excellent formability.

As a method for producing high pressure low density polyethylene, high pressure radical polymerization may be mentioned, and such a resin may be properly selected from among commercial products. For example, PETROTHENE, tradename, manufactured by Tosoh Corporation, is commercially available. A method for producing high density polyethylene, an ethylene/1-butene copolymer and an ethylene/1-hexene copolymer is not particularly limited, and a high, medium or low pressure ionic polymerization using Ziegler-Natty catalyst, Phillips catalyst or metallocene catalyst may, for example, be mentioned, and such a resin may be properly selected from among commercial products. For example, Nipolon hard, Nipolon-L and Nipolon-Z, tradenames, manufactured by Tosoh Corporation, are commercially available.

A method for producing polypropylene is not particularly limited, and polypropylene may be obtained typically by polymerizing propylene or copolymerizing propylene and at least one other α-olefin, in the presence of a catalyst comprising a solid titanium catalyst component and an organic metal compound catalyst component, a catalyst comprising both the components and an electron-donator, or a single site catalyst represented by metallocene catalyst. Such a resin may be properly selected from among commercial products. For example, NOVATEC and WINTEC, tradenames, manufactured by Japan Polypropylene Corporation may be commercially available.

The copolymer (B) of ethylene and a vinyl ester and/or an acrylic acid ester of the present invention has a vinyl ester and/or acrylic acid ester content of higher by at least 5 mol % than (A).

The copolymer (B) of ethylene and a vinyl ester and/or an acrylic acid ester may, for example, be an ethylene/vinyl acetate copolymer, an ethylene/acrylic acid ester copolymer, an ethylene/methacrylic acid ester copolymer. Among them, in view of the cost, preferred is an ethylene/vinyl acetate copolymer. Further, in view of the cost, an ethylene/vinyl acetate copolymer is preferred. Further, in view of the adhesion to EVOH, it is preferably one having a vinyl ester and/or acrylic acid ester content of from 5 to 35 mol %.

A method for producing an ethylene/vinyl acetate copolymer is not particularly limited so long as an ethylene/vinyl acetate copolymer can be produced, and may, for example, be known high pressure radical polymerization method or ionic polymerization method. As an ethylene/vinyl acetate copolymer produced by high pressure radical polymerization method, Ultrathene, tradename, manufactured by Tosoh Corporation is commercially available.

As a preferred blend ratio of the composition, with a view to improving adhesion to both polymers, the composition contains from 5 to 95 parts by weight of the thermoplastic resin (A) and from 5 to 95 parts by weight of the copolymer (B) of ethylene and a vinyl ester and/or an acrylic acid ester (the total amount of (1) and (2) is 100 parts by weight), more preferably contains from 15 to 85 parts by weight of the thermoplastic resin (A) and from 15 to 85 parts by weight of the copolymer (B) of ethylene and a vinyl ester and/or an acrylic acid ester (the total amount of (A) and (B) is 100 parts by weight), most preferably from 20 to 80 parts by weight of the thermoplastic resin (A) and from 20 to 80 parts by weight of the copolymer (B) of ethylene and a vinyl ester and/or an acrylic acid ester (the total amount of (A) and (B) is 100 parts by weight).

A graft modification method of the thermoplastic resin (A) and the copolymer (B) of ethylene and a vinyl ester and/or an acrylic acid ester is not particularly limited so long as graft modification is possible, is suitably selected considering the reactivity, etc., and may be a method of graft copolymerizing ethylene and vinyl acetate to (A), a method of graft copolymerizing ethylene alone or ethylene and an α-olefin to (B), or a method of preliminarily polymerizing (A) and (B) and graft-modifying the polymer with a crosslinking agent (C). In view of the productivity, preferred is to add a crosslinking agent (C) to the above components (A) and (B). In a case where the thermoplastic resin (A) is polyethylene or polypropylene, it is most preferred to use an organic peroxide as the crosslinking agent (C).

The organic peroxide as the crosslinking agent (C) is not particularly limited so long as it is an organic peroxide and may, for example, be dicumyl peroxide, di-t-butyl peroxide, 2,5-dimethyl-2,5-di(t-butylperoxy)hexane, 1,1-di(t-butylperoxy)cyclohexane, 2,5-dimethyl-2,5-di(t-butylperoxy)

hexyne-3,1,3-bis(t-butylperoxyisopropyl)benzene, 1,1-bis (t-butylperoxy)-3,3,5-trimethylcyclohexane, 1,3-di-(t-butylperoxy)-diisopropylbenzene, n-butyl-4,4-bis(t-butylperoxy)valerate, benzoyl peroxide, p-chlorobenzoyl peroxide, 2,4-dichlorobenzoyl peroxide, t-butylperoxy benzoate, t-butylperoxyisopropyl carbonate, diacetyl peroxide, lauroyl peroxide or t-butyl cumyl peroxide. They may be used alone or as a mixture of two or more.

Among them, 2,5-dimethyl-2,5-di(t-butylperoxy)hexane or 1,1-di(t-butylperoxy)cyclohexane is preferably used from the viewpoint of the reactivity. Further, a crosslinking aid such as triallyl isocyanurate or divinylbenzene may be used, together with the crosslinking agent (C), as the case requires.

The amount of the crosslinking agent (C) to the total amount of 100 parts by weight of the thermoplastic resin (A) and the copolymer (B) of ethylene and a vinyl ester and/or an acrylic acid ester is preferably from 0.005 to 1 part by weight with a view to improving the adhesion to EVOH and in view of formability.

The resin composition having at least a part of the thermoplastic resin (A) grafted by the copolymer (B) of ethylene and a vinyl ester and/or an acrylic acid ester of the present invention is, in the case of being produced by using the above components (A), (B) and (C), preferably produced by a method of melt-kneading these components, in view of the economical efficiency.

The melt-kneading method is not particularly limited so long as a melt-kneading apparatus capable of uniformly dispersing the respective components is used, and a commonly employed resin mixing apparatus may be used. For example, a melt-kneading apparatus such as a single screw extruder, a multi-screw extruder, a banbury mixer, a pressure kneader or a revolving roll may be mentioned. Among them, a twin screw extruder which can be operated continuously with high degree of mixing is preferred, whereby the dispersed state will be fine and uniform. The melting temperature is preferably at a level of from the melting point of the thermoplastic resin (A) to 260° C.

As a specific example of a process for producing a resin composition having at least a part of the thermoplastic resin (A) grafted by the copolymer (B) of ethylene and a vinyl ester and/or an acrylic acid ester of the present invention is as follows.

A dry blended product of the components (A) to (C) is charged to a hopper of an extruder. At least a part of the thermoplastic resin (A), the copolymer (B) of ethylene and a vinyl ester and/or an acrylic acid ester and the crosslinking agent (C) may be added from the side feeder or the like. Otherwise, they may be sequentially melt kneaded stepwise using two or more extruders. For mixing the components (A) to (C), a Henschel mixer, a V blender, a ribbon blender, a tumbler or the like may also be used.

Further, the resin composition having at least a part of the thermoplastic resin (A) grafted by the copolymer (B) of ethylene and a vinyl ester and/or an acrylic acid ester of the present invention may be one having, in addition to the above components, as the case requires, an additive which is commonly used for a thermoplastic resin, such as a crosslinking aid, an antioxidant, a lubricant, a neutralizing agent, an anti-blocking agent, a surfactant or a slip agent or other thermoplastic resin such as a polyolefin incorporated.

Further, the resin composition of the present invention is preferably a resin composition having a resin containing the thermoplastic resin (A) or the copolymer (B) of ethylene and a vinyl ester and/or an acrylic acid ester dispersed. Here, the dispersed particle size of the resin containing the thermoplastic resin (A) or the copolymer (B) of ethylene and a vinyl ester and/or an acrylic acid ester is preferably from 0.01 to 50 μm.

To obtain the adhesive of the present invention, a treatment method of hydrolyzing the resin composition is not particularly limited, and in view of the productivity, it is preferred that pellets or a powder of the resin composition is directly subjected to hydrolysis treatment in an alkali. Further, the adhesive of the present invention is preferably such that the saponification degree of the vinyl ester and/or acrylic acid ester component is at least 10 mol %. When tit is at least 10 mol %, sufficient adhesion to EVOH will be achieved.

Further, the loss angle δ (arctan(G"/G')) which is the phase angle of distortion and stress or deflection and load, under conditions such that the complex elastic modulus G* ((storage elastic modulus $G'^2$+loss elastic modulus $G''^2)^{1/2}$) obtained by dynamic viscoelasticity measurement of the hydrolyzate of the present invention will be 500 Pa, is preferably at most 80 degree, with a view to improving the adhesion to a polyolefin such as polyethylene or polypropylene and to EVOH.

Further, polyvinyl alcohol and/or an ethylene/vinyl alcohol copolymer, or a polyolefin may be added to the adhesive of the present invention, so that the adhesive is used as an adhesive resin composition.

The polyvinyl alcohol and/or EVOH added to the adhesive of the present invention is a polymer composed mainly of vinyl alcohol units or a copolymer composed of ethylene units and vinyl alcohol units. The polyvinyl alcohol and/or EVOH used in the present invention is not particularly limited and may be known one used for forming. However, the content of ethylene units in the polyvinyl alcohol and/or EVOH is preferably at most 55 mol %, more preferably from 10 to 55 mol % in view of high barrier property against a gas, an organic liquid, etc. and favorable formability.

A method for producing the polyvinyl alcohol and/or EVOH is not particularly limited. For example; in accordance with a known method, a polymer of a fatty acid vinyl ester or a copolymer of ethylene and a fatty acid vinyl ester is produced, which is then hydrolyzed to produce a polyvinyl alcohol and/or EVOH. Such a resin may be properly selected from among commercial products, and for example, POVAL and EVAL, tradenames, manufactured by KURARAY CO., LTD., and GOHSENOL and Soarnol, tradenames, manufactured by The Nippon Synthetic Chemical Industry Co., Ltd. are commercially available.

Further, EVOH may have a small amount of other constituting units in addition to the ethylene units and the vinyl alcohol units.

The melt flow mass rate (temperature: 190° C., load: 2.16 kg) of the polyvinyl alcohol and/or EVOH is preferably from 0.1 to 100 g/10 min, more preferably from 0.5 to 50 g/10 min, most preferably from 1 to 20 g/10 min, in view of formability.

As a preferred blend ratio of the adhesive and the polyvinyl alcohol and/or EVOH, with a view to improving the adhesion to a polyolefin such as polyethylene or polypropylene, the composition contains from 10 to 90 parts by weight of the adhesive and from 10 to 90 parts by weight of the polyvinyl alcohol and/or EVOH (their total amount is 100 parts by weight), preferably from 15 to 85 parts by weight of the adhesive and from 15 to 85 parts by weight of the polyvinyl alcohol and/or EVOH (their total amount is 100 parts by weight), most preferably from 20 to 80 parts by weight of the adhesive and from 20 to 80 parts by weight of the polyvinyl alcohol and/or EVOH (their total amount is 100 parts by weight).

The polyolefin to be added to the adhesive of the present invention may be the same as the thermoplastic resin (A) and is not particularly limited. For example, an ethylene-based polymer such as high pressure low density polyethylene, high density polyethylene, medium density polyethylene, an ethylene/1-butene copolymer, an ethylene/1-hexene copolymer, an ethylene/1-octene copolymer, an ethylene/4-methyl-1-pentene copolymer; an ethylene/vinyl acetate copolymer, an ethylene/acrylic acid ester copolymer or an ethylene/methacrylic acid ester copolymer, polypropylene, a propylene/ethylene copolymer, a propylene/1-butene copolymer, poly 1-butene, poly 1-hexene or poly 4-methyl-1-pentene may, for example, be mentioned.

As a preferred blend ratio of the adhesive to the polyolefin, with a view to improving the adhesion to EVOH and to a polyolefin, the composition preferably contains from 10 to 90 parts by weight of the adhesive and from 10 to 90 parts by weight of the polyolefin (the total amount of the adhesive and the polyolefin is 100 parts by weight), more preferably from 15 to 85 parts by weight of the adhesive and from 15 to 85 parts by weight of the polyolefin (the total amount of the adhesive and the polyolefin is 100 parts by weight), most preferably from 20 to 80 parts by weight of the adhesive and from 20 to 80 parts by weight of the polyolefin (the total amount of the adhesive and the polyolefin is 100 parts by weight).

The adhesive or the adhesive resin composition of the present invention may be used in an optional form, such as pellets or a powder.

Further, the adhesive or the adhesive resin composition of the present invention may be used in the form of a laminate comprising a layer formed from the adhesive or the adhesive resin composition and at least one layer formed from another material.

The laminate of the present invention preferably has a layer formed from the adhesive or the adhesive resin composition and at least one layer formed from a polyolefin such as polyethylene or polypropylene, a polyester such as polylactic acid or polybutylene terephthalate, a polyamide such as nylon or EVOH. Further, the laminate may have a laminate structure comprising two or more combinations thereof or a combination of various thermoplastic resin layers. Particularly in view of the cost and the formability, the laminate preferably has a layer formed from polyethylene or polypropylene and a layer formed from EVOH.

The laminate of the present invention may be formed by using a conventional forming apparatus. The forming method may be an optional method such as extrusion, blow molding, sheet forming, injection molding, compression molding, calendaring or vacuum forming. The laminate of the present invention may be formed into an optional shape such as a sheet, a film, a pipe, a block or the like. By employing a laminate structure with another material, it is possible to impart to the laminate properties of another material such as gas barrier property, mechanical properties, oil resistance or weather resistance, The laminate of the present invention is useful for e.g. a packaging material or a container made from a thermoplastic resin for food, beverages, pharmaceutical preparations, etc. for which such properties are required, Advantageous Effects of Invention The adhesive and the adhesive resin composition of the present invention are excellent in adhesion to a thermoplastic resin such as polyethylene or polypropylene and to EVOH and are capable of bonding a thermoplastic resin and EVOH.

EXAMPLES

Now, the present invention will be described in further detail with reference to Examples. However, it should be understood that the present invention is by no means restricted to such specific Examples.

[Saponification Degree]

The adhesives obtained in Examples were subjected to measurement in accordance with JIS K7192 (1999).

[Dispersed Particle Size]

Each of the adhesives obtained in Examples was subjected to press forming using a 50 t automatic pressing machine manufactured by SHINTO Metal Industries Corporation. Then, a cross section of the press formed product was adjusted by a Cryomicrotome (manufactured by RMC-Boeckeler, Ultramicrotome MT-XL+CR-X), and the adjusted surface was subjected to Ar plasma etching (2 W, 10 min), The etched surface was subjected to Os coating, and then the dispersed particle size was evaluated by SEM observation (manufactured by Keyence Corporation, SEM VE-9800).

[Adhesive Strength]

Adhesion of each of the adhesives obtained in Examples to adherends (LDPE or PP and EVOH) was examined. The adhesive strength was evaluated as follows. About 4 g of pellets were subjected to press forming using a 50 t automatic pressing machine manufactured by SHINTO Metal Industries Corporation. The size of the formed product was 150 mm×150 mm×0.1 mm. Then, the adherends were heat-sealed with the adhesive using a hot tack tester manufactured by TESTER SANGYO CO., Ltd., at a sealing temperature of 200° C. under a sealing pressure of 0.1 MPa for a sealing time of 1 second by sandwich heating, and the adhesive strength (N/15 mm width) by 180° peeling was measured using a tensile tester (manufactured by ORIENTEC CORPORATION, TENSILON RTE-1210) with a sample width of 15 mm at a tensile rate of 300 mm/min. LOPE, PP, PS and EVOH used for evaluation were as follows.

(1) LOPE: low density polyethylene having a melt mass flow rate of 7 g/10 min and a density of 922 kg/m$^3$ (manufactured by Tosoh Corporation, tradename: PETROTHENE 204)

(2) PP: polypropylene having a melt mass flow rate of 6.5 g/10 min and a density of 900 kg/m$^3$ (manufactured by Japan Polypropylene Corporation, tradename: NOVATEC FW4BT)

(3) PS: polystyrene having a melt mass flow rate of 2.4 g/10 min (manufactured by DIC Corporation, tradename: GH-8300-1)

(4) EVOH: an ethylene/vinyl alcohol copolymer having a melt mass flow rate of 5.7 g/10 min, and an ethylene content of 44 mol % (manufactured by Kuraray Co., Ltd., tradename: EVAL E105B)

Example 1

70 parts by weight of a low density polyethylene having a melt mass flow rate of 16 g/10 min and a density of 920 kg/m$^3$ (manufactured by Tosoh Corporation, tradename: PETROTHENE 350) as the thermoplastic resin composition (A), 30 parts by weight of an ethylene/vinyl acetate copolymer having a melt mass flow rate of 70 g/10 min, a density of 968 kg/m$^3$ and a vinyl acetate content of 42 wt % (manufactured by Tosoh Corporation, tradename: Ultrathene 760, hereinafter referred to simply as EVA) as the copolymer (B) of ethylene and a vinyl ester and/or an acrylic acid ester, and 0.1 part by weight of an organic peroxide (manufactured by NOF Corporation, tradename: PERHEXA 25B) as the crosslinking agent (C) were dry-blended, and melt-kneaded by a twin screw extruder at a molten resin temperature of 190° C. to obtain a graft product in the form of pellets. Then, the graft product was subjected to hydrolysis treatment at 60° C. in 1 part by weight of a sodium hydroxide methanol solution to obtain the present adhesive (saponification degree: 75 mol %, dispersed particle size: 0.1 to 2 μm), Using the obtained adhesive, the adhesion to LOPE and to EVOH was evaluated, whereupon the results were as identified in Table 1.

Example 2

The present adhesive (saponification degree: 75 mol %, dispersed particle size: unmeasurable) was obtained in the same manner as in Example 1 except that 50 parts by weight of a low density polyethylene having a melt mass flow rate of 16 g/10 min and a density of 920 kg/m$^3$ (manufactured by Tosoh Corporation, tradename: PETROTHENE 350) as the thermoplastic resin composition (A) and 50 parts by weight of an ethylene/vinyl acetate copolymer having a melt mass flow rate of 70 g/10 min, a density of 968 kg/m$^3$ and a vinyl acetate content of 42 wt % (manufactured by Tosoh Corporation, tradename: Ultrathene 760) as the copolymer (B) of ethylene and a vinyl ester and/or an acrylic acid ester were used. Evaluation was made using the obtained adhesive, whereupon the results are as identified in Table 1.

Example 3

The present adhesive (saponification degree: 75 mol %, dispersed particle size: 0.1 to 2 μm) was obtained in the same manner as in Example 1 except that 30 parts by weight of a low density polyethylene having a melt mass flow rate of 16 g/10 min and a density of 920 kg/m$^3$ (manufactured by Tosoh Corporation, tradename: PETROTHENE 350) as the thermoplastic resin composition (A) and 70 parts by weight of an ethylene/vinyl acetate copolymer having a melt mass flow rate of 70 g/10 min, a density of 968 kg/m$^3$, and a vinyl acetate content of 42 wt % (manufactured by Tosoh Corporation, tradename: Ultrathene 760) as the copolymer (B) of ethylene and a vinyl ester and/or an acrylic acid ester were used. Evaluation was made using the obtained adhesive, whereupon the results are as identified in Table 1.

Example 4

The present adhesive (saponification degree: 75 mol %, dispersed particle size: 0.1 to 2 μm) was obtained in the same manner as in Example 1 except that 70 parts by weight of a low density polyethylene having a melt mass flow rate of 20 g/10 min and a density of 920 kg/m$^3$ (manufactured by Tosoh Corporation, tradename: Nipolon-L M65, hereinafter referred to simply as LLDPE) as the thermoplastic resin composition (A) and 30 parts by weight of an ethylene/vinyl acetate copolymer having a melt mass flow rate of 70 g/10 min, a density of 968 kg/m$^3$ and a vinyl acetate content of 42 wt % (manufactured by Tosoh Corporation, tradename: Ultrathene 760) as the copolymer (B) of ethylene and a vinyl ester and/or an acrylic acid ester were used. Evaluation was made using the obtained adhesive, whereupon the results are as identified in Table 1.

Example 5

The present adhesive (saponification degree: 75 mol %, dispersed particle size: 0.1 to 2 μm) was obtained in the same manner as in Example 1 except that 70 parts by weight of a polypropylene having a melt mass flow rate of 6.5 g/10 min and a density of 900 kg/m$^3$ (manufactured by Japan Polypropylene Corporation, tradename: NOVATEC FW4BT, hereinafter referred to simply as PP) as the thermoplastic resin composition (A) and 30 parts by weight of an ethylene/ vinyl acetate copolymer having a melt mass flow rate of 70 g/10 min, a density of 968 kg/m$^3$ and a vinyl acetate content of 42 wt % (manufactured by Tosoh Corporation, tradename: Ultrathene 760) as the copolymer (B) of ethylene and a vinyl ester and/or an acrylic acid ester were used. Evaluation was made using the obtained adhesive, whereupon the results are as identified in Table 1.

Example 6

The present adhesive (saponification degree: 20 mol %, dispersed particle size: 0.1 to 2 μm) was obtained in the same manner as in Example 1 except that 70 parts by weight of an ethylene/vinyl acetate copolymer having a melt mass flow rate of 14/10 min, a density of 935 kg/m$^3$ and a vinyl acetate content of 15 wt % (manufactured by Tosoh Corporation, tradename: Ultrathene 625) as the thermoplastic resin composition (A), 30 parts by weight of an ethylene/vinyl acetate copolymer having a melt mass flow rate of 70 g/10 min, a density of 968 kg/m$^3$ and a vinyl acetate content of 42 wt % (manufactured by Tosoh Corporation, tradename: Ultrathene 760) as the copolymer (B) of ethylene and a vinyl ester and/or an acrylic acid ester and 0.001 part by weight of an organic peroxide (manufactured by NOF Corporation, tradename: PERHEXA C) as the crosslinking agent (C) were dry-blended. Evaluation was made using the obtained adhesive, whereupon the results are as identified in Table 1.

Example 7

The present adhesive (saponification degree: 20 mol %, dispersed particle size: 0.1 to 2 μm) was obtained in the same manner as in Example 6 except that 0.1 part by weight of the crosslinking agent (0-2) was added. Evaluation was made using the obtained adhesive, whereupon the results are as identified in Table 1.

Example 8

The present adhesive (saponification degree: 25 mol %, dispersed particle size: 0.1 to 2 μm) was obtained in the same manner as in Example 1 except that 70 parts by weight of an ethylene/vinyl acetate copolymer having a melt mass flow rate of 14 g/10 min, a density of 935 kg/m$^3$ and a vinyl acetate content of 15 wt % (manufactured by Tosoh Corporation, tradename: Ultrathene 625) as the thermoplastic resin composition (A), 30 parts by weight of an ethylene/vinyl acetate copolymer having a vinyl acetate content of 70 wt % (manufactured by The Nippon Synthetic Chemical Industry Co., Ltd., tradename: Soarblen DH) as the copolymer (B) of ethylene and a vinyl ester and/or an acrylic acid ester and 0.1 part by weight of the crosslinking agent (C-2) were dry-blended. Evaluation was made using the obtained adhesive, whereupon the results are as identified in Table 1.

Example 9

The present adhesive (saponification degree: 40 mol %, dispersed particle size: 0.1 to 2 µm) was obtained in the same manner as in Example 1 except that 70 parts by weight of an ethylene/vinyl acetate copolymer having a melt mass flow rate of 5:7/10 min, a density of 952 kg/m³ and a vinyl acetate content of 28 wt % (manufactured by Tosoh Corporation, tradename: Ultrathene 751) as the thermoplastic resin composition (A) and 30 parts by weight of an ethylene/vinyl acetate copolymer having a melt mass flow rate of 70 g/10 min, a density of 968 kg/m³ and a vinyl acetate content of 42 wt % (manufactured by Tosoh Corporation, tradename: Ultrathene 760) were used. Evaluation was made using the obtained adhesive, whereupon the results are as identified in Table 1.

Example 10

The present adhesive (saponification degree: 40 mol %, dispersed particle size: 0.1 to 2 µm) was obtained in the same manner as in Example 1 except that 30 parts by weight of a hydrogenated styrene thermoplastic elastomer having a melt mass flow rate of 65 g/10 min (200° C., 5.0 kg) (manufactured by Kraton Corporation, tradename: KRATON G: G1726) as the thermoplastic resin composition (A) and 70 parts by weight of an ethylene/vinyl acetate copolymer having a melt mass flow rate of 70 g/10 min, a density of 968 kg/m³ and a vinyl acetate content of 42 wt % (manufactured by Tosoh Corporation, tradename: Ultrathene 760) were used. Evaluation was made using the obtained adhesive, whereupon the results are as identified in Table 1.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Loss angle of adhesive under 500 Pa | | 78 | 76 | 75 | 79 | 77 | 80 | 70 | 68 | 65 | 76 |
| Adhesive strength | To EVOH | 15 | 16 | 20 | 16 | 15 | 6 | 14 | 19 | 18 | 10 |
| (N/15 mm width) | To LDPE, To PP, or To PS | 20 | 17 | 15 | 24 | 22 | 14 | 11 | 7 | 6 | 8 |

Comparative Example 1

The present adhesive (saponification degree: 70 mol %) was obtained in the same manner as in Example 1 except that 0.1 part by weight of the crosslinking agent (C-1) was dry-blended with a low density polyethylene having a melt mass flow rate of 16 g/10 min and a density of 920 kg/m³ (manufactured by Tosoh Corporation, tradename: PETROTHENE 350) as the thermoplastic resin composition. Evaluation was made using the obtained adhesive, whereupon the adhesion to EVOH was low. The results are shown in Table 2.

Comparative Example 2

The present adhesive (saponification degree: 70 mol %) was obtained in the same manner as in Example 1 except that 0.1 part by weight of the crosslinking agent (C-2) was dry-blended with an ethylene/vinyl acetate copolymer having a melt mass flow rate of 70 g/10 min, a density of 968 kg/m³ and a vinyl acetate content of 42 wt % (manufactured by Tosoh Corporation, tradename: Ultrathene 760) as the copolymer (B) of ethylene and a vinyl ester and/or an acrylic acid ester. Evaluation was made using the obtained adhesive, whereupon the adhesion to EVOH was low. The results are shown in Table 2.

Comparative Example 3

The present adhesive (saponification degree: 75 mol %) was obtained in the same manner as in Example 1 except that no crosslinking agent was used. Evaluation was made using the obtained adhesive, whereupon the adhesion to EVOH was low. The results are shown in Table 2.

Comparative Example 4

The present adhesive (saponification degree: 0 mol %) was obtained in the same manner as in Example 1 except that no hydrolysis treatment was conducted. Evaluation was made using the obtained adhesive, whereupon the adhesion to EVOH was low. The results are shown in Table 2.

TABLE 2

|  |  | Comp. Ex. 1 | Comp. Ex. 2 | Comp. Ex. 3 | Comp. Ex. 4 |
|---|---|---|---|---|---|
| Loss angle of adhesive under 500 Pa | | 79 | 70 | 84 | 79 |
| Adhesive strength (N/15 mm width) | To EVOH | 0.5 | 10 | 0.5 | 1.2 |
|  | To LDPE, To PP, or To PS | 13 | 0.4 | 12 | 14 |

Example 11

75 Parts by weight of adhesive 1 produced by the following production method, and 25 parts by weight of an ethylene/vinyl alcohol copolymer having a melt mass flow rate of 5.4 g/10 min and an ethylene content of 44 mol % (manufactured by Kuraray Co., Ltd., tradename: E-105B, hereinafter referred to as EVOH 1) were dry-blended and charged into a labo plastomill set at 200° C., and kneading was started. 3 Minutes after initiation of kneading, kneading was completed, and the kneaded product was cooled to room temperature to obtain an adhesive resin composition. Using the obtained adhesive resin composition, adhesion to LDPE was evaluated, whereupon the result was as identified in Table 3.

[Method for Producing Adhesive 1]

70 Parts by weight of a high pressure low density polyethylene having a melt mass flow rate of 45 g/10 min and a density of 924 kg/m³ (manufactured by Tosoh Corporation, tradename: PETROTHENE 209, hereinafter referred to as (A-1)), 30 parts by weight of an ethylene/vinyl acetate copolymer having a melt mass flow rate of 70 g/10 min, a density of 968 kg/m³ and a vinyl acetate content of 42 wt % (19 mol %) (manufactured by Tosoh Corporation, tradename: Ultrathene 760, hereinafter referred to as (B)) as the copolymer (B) of ethylene and a vinyl ester and/or an acrylic acid ester, and 0.1 part by weight of an organic peroxide (manufactured by NOF Corporation, tradename: PERHEXA 25B) were dry-blended, and melt-kneaded by a twin screw extruder at a molten resin temperature of 190° C. to obtain a sample in the form of pellets. Then, the sample was subjected to hydrolysis treatment at 60° C. in a 1 wt % sodium hydroxide methanol solution to obtain the present adhesive (saponification degree of copolymer (B) of ethylene and a vinyl ester and/or an acrylic acid ester of 50 mol %).

Example 12

An adhesive resin composition was produced in the same manner as in Example 11 except that 50 parts by weight of the adhesive 1 and 50 parts by weight of EVOH 1 were used, and adhesion of the obtained adhesive resin composition to LOPE was evaluated, whereupon the result was as identified in Table 3.

Example 13

An adhesive resin composition was produced in the same manner as in Example 11 except that 30 parts by weight of the adhesive 1 and 70 parts by weight of EVOH 1 were used, and adhesion of the obtained adhesive resin composition to LOPE was evaluated, whereupon the result was as identified in Table 3.

Example 14

An adhesive resin composition was produced in the same manner as in Example 11 except that 50 parts by weight of the adhesive 1 and 50 parts by weight of an ethylene/vinyl alcohol copolymer having a melt mass flow rate of 1.7 g/10 min and an ethylene content of 32 mol % (manufactured by Kuraray Co., Ltd., tradename: F-171B, hereinafter referred to as EVOH 2) were used, and the adhesion of the obtained adhesive resin composition to LOPE was evaluated, whereupon the result was as identified in Table 3.

Example 15

An adhesive resin composition was produced in the same manner as in Example 11 except that 50 parts by weight of adhesive 2 produced by the following production method and 50 parts by weight of EVOH 1 were used, and the adhesion of the obtained adhesive resin composition to LOPE was evaluated, whereupon the result was as identified in Table 3.
[Method for Producing Adhesive 2]
The present adhesive (saponification degree of copolymer (B) of ethylene and a vinyl ester and/or an acrylic acid ester of 50 mol %) was produced in the same manner as in the production of the adhesive 1 except that 30 parts by weight of (A-1) and 70 parts by weight of (B) were used.

Example 16

An adhesive resin composition was produced in the same manner as in Example 11 except that 50 parts by weight of adhesive 3 produced by the following production method and 50 parts by weight of EVOH 1 were used, and the adhesion of the obtained adhesive resin composition to LDPE was evaluated, whereupon the result was as identified in Table 3.

[Method for Producing Adhesive 3]
The present adhesive (saponification degree of copolymer (B) of ethylene and a vinyl ester and/or an acrylic acid ester of 50 mol %) was produced in the same manner as in the production of the adhesive 1 except that 70 parts by weight of an ethylene/vinyl acetate copolymer having a melt mass flow rate of 14 g/10 min, a density of 935 kg/m$^3$ and a vinyl acetate content of 15 wt % (5.4 mol %) (manufactured by Tosoh Corporation, tradename: Ultrathene 625) was used instead of (A-1) and 30 parts by weight of (B) was used.

TABLE 3

| | | Ex. 11 | Ex. 12 | Ex. 13 | Ex. 14 | Ex. 15 | Ex. 16 |
|---|---|---|---|---|---|---|---|
| Adhesive | Adhesive 1 | 75 | 50 | 30 | 50 | | |
| | Adhesive 2 | | | | | 50 | |
| | Adhesive 3 | | | | | | 50 |
| EVOH | EVOH 1 | 25 | 50 | 70 | | 50 | 50 |
| | EVOH 2 | | | | 50 | | |
| Adhesive strength (N/15 mm width) to LDPE | | 10 | 8 | 3 | 8 | 5 | 8 |

Comparative Example 5

An adhesive resin composition was produced in the same manner as in Example 1 except that EVOH 1 was used, and the adhesion of the obtained adhesive resin composition to LDPE was evaluated, whereupon the result was as identified in Table 4.

Comparative Example 6

An adhesive resin composition was produced in the same manner as in Example 11 except that 50 parts by weight of adhesive 4 produced by the following production method and 50 parts by weight of EVOH 1 were used, and the adhesion of the obtained adhesive resin composition to LOPE was evaluated, whereupon the result was as identified in Table 4.
[Method for Producing Adhesive 4]
Adhesive 4 (saponification degree of copolymer (B) of ethylene and a vinyl ester and/or an acrylic acid ester of 50 mol %) was produced in the same manner as in the production of the adhesive 1 except that 100 parts by weight of (B) was used.

Comparative Example 7

An adhesive resin composition was produced in the same manner as in Example 11 except that 50 parts by weight of adhesive 5 produced by the following production method and 50 parts by weight of EVOH 1 were used, and the adhesion of the obtained adhesive resin composition to LDPE was evaluated, whereupon the result was as identified in Table 4.
[Method for Producing Adhesive 5]
Adhesive 5 was produced in the same manner as in the production of the adhesive 1 except that 100 parts by weight of (A-1) was used.

Comparative Example 8

An adhesive resin composition was produced in the same manner as in Example 1 except that 50 parts by weight of adhesive 6 produced by the following production method and 50 parts by weight of EVOH 1 were used, and the adhesion of the obtained adhesive resin composition to LDPE was evaluated, whereupon the result was as identified in Table 4.

[Method for Producing Adhesive 6]

Adhesive 6 was produced in the same manner as in the production of the adhesive 1 except that the graft product was not subjected to a hydrolysis treatment.

TABLE 4

|  |  | Comp. Ex. 5 | Comp. Ex. 6 | Comp. Ex. 7 | Comp. Ex. 8 |
|---|---|---|---|---|---|
| Adhesive | Adhesive 1 | 0 |  |  |  |
|  | Adhesive 4 |  | 50 |  |  |
|  | Adhesive 5 |  |  | 50 |  |
|  | Adhesive 6 |  |  |  | 50 |
| EVOH | EVOH 1 | 100 | 50 | 50 | 50 |
|  | EVOH 2 |  |  |  |  |
| Adhesive strength (N/15 mm width) to LDPE |  | 0.5 | 0.5 | 0.6 | 0.3 |

Example 17

75 Parts by weight of adhesive 1 described in Example 11 and 25 parts by weight of a high pressure low density polyethylene having a melt mass flow rate of 3 g/10 min and a density of 924 kg/m$^3$ (manufactured by Tosoh Corporation, tradename: PETROTHENE 205, hereinafter referred to as LOPE (MFR3)) were dry-blended and charged into a labo plastomill set at 200° C., and kneading was started, 3 Minutes after initiation of kneading, kneading was completed, and the kneaded product was cooled to room temperature to obtain an adhesive resin composition. The adhesion of the obtained adhesive resin composition to EVOH and LOPE was evaluated, whereupon the results were as identified in Table 5.

Example 18

An adhesive resin composition was produced in the same manner as in Example 17 except that 50 parts by weight of adhesive 1 described in Example 11 and 50 parts by weight of LOPE (MFR3) were used, and the adhesion of the obtained adhesive resin composition to EVOH and LOPE was evaluated, whereupon the results were as identified in Table 5.

Example 19

An adhesive resin composition was produced in the same manner as in Example 17 except that 40 parts by weight of adhesive 1 described in Example 11 and 60 parts by weight of LOPE (MFR3) were used, and the adhesion of the obtained adhesive resin composition to EVOH and LOPE was evaluated, whereupon the results were as identified in Table 5.

Example 20

An adhesive resin composition was produced in the same manner as in Example 17 except that 50 parts by weight of adhesive 1 described in Example 11 and 50 parts by weight of a high pressure low density polyethylene having a melt mass flow rate of 8 g/10 min and a density of 919 kg/m$^3$ (manufactured by Tosoh Corporation, tradename: PETROTHENE 203, hereinafter referred to as LOPE (MFR8)) were used, and the adhesion of the obtained adhesive resin composition to EVOH and LOPE was evaluated, whereupon the results were as identified in Table 5.

Example 21

An adhesive resin composition was produced in the same manner as in Example 17 except that 50 parts by weight of adhesive 2 described in Example 15 and 50 parts by weight of LOPE (MFR3) were used, and the adhesion of the obtained adhesive resin composition to EVOH and LOPE was evaluated, whereupon the results were as identified in Table 5.

Example 22

An adhesive resin composition was produced in the same manner as in Example 17 except that 75 parts by weight of adhesive 3 described in Example 16 and 25 parts by weight of LOPE (MFR3) were used, and the adhesion of the obtained adhesive resin composition to EVOH and LOPE was evaluated, whereupon the results were as identified in Table 5.

TABLE 5

|  |  | Ex. 17 | Ex. 18 | Ex. 19 | Ex. 20 | Ex. 21 | Ex. 22 |
|---|---|---|---|---|---|---|---|
| Adhesive | Adhesive 1 | 75 | 50 | 40 | 50 |  |  |
|  | Adhesive 2 |  |  |  |  | 50 |  |
|  | Adhesive 3 |  |  |  |  |  | 75 |
| Polyolefin | LDPE (MFR3) | 25 | 50 | 60 |  | 50 | 25 |
|  | LDPE (MFR8) |  |  |  | 50 |  |  |
| Adhesive strength (N/15 mm width) to EVOH |  | 4 | 2.5 | 2 | 3 | 7 | 6 |
| Adhesive strength (N/15 mm width) to LDPE |  | 12 | 12 | 12 | 12 | 3 | 10 |

Comparative Example 9

An adhesive resin composition was produced in the same manner as in Example 17 except that LDPE (MFR3) was used, and the adhesion of the obtained adhesive resin composition to EVOH and LDPE was evaluated, whereupon the results were as identified in Table 6.

Comparative Example 10

An adhesive resin composition was produced in the same manner as in Example 17 except that 50 parts by weight of adhesive 4 described in Comparative Example 6 and 50 parts by weight of LDPE (MFR3) were used, and the adhesion of the obtained adhesive resin composition to LOPE was evaluated, whereupon the result was as identified in Table 6.

Comparative Example 11

An adhesive resin composition was produced in the same manner as in Example 17 except that 50 parts by weight of adhesive 5 described in Comparative Example 7 and 50 parts by weight of LOPE (MFR3) were used, and the adhesion of the obtained adhesive resin composition to LOPE was evaluated, whereupon the result was as identified in Table 6.

Comparative Example 12

An adhesive resin composition was produced in the same manner as in Example 17 except that 50 parts by weight of adhesive 6 described in Comparative Example 8 and 50 parts by weight of LOPE (MFR3) were used, and the adhesion of the obtained adhesive resin composition to LOPE was evaluated, whereupon the result was as identified in Table 6.

TABLE 6

|  |  | Comp. Ex. 9 | Comp. Ex. 10 | Comp. Ex. 11 | Comp. Ex. 12 |
|---|---|---|---|---|---|
| Adhesive | Adhesive 1 | 0 |  |  |  |
|  | Adhesive 4 |  | 50 |  |  |
|  | Adhesive 5 |  |  | 50 |  |
|  | Adhesive 6 |  |  |  | 50 |
| Polyolefin | LDPE (MFR3) | 100 | 50 | 50 | 50 |
|  | LDPE (MFR8) |  |  |  |  |
| Adhesive strength (N/15 mm width) to EVOH |  | 0.5 | 5 | 0.5 | 0.3 |
| Adhesive strength (N/15 mm width) to LDPE |  | 12 | 0.5 | 12 | 12 |

The entire disclosures of Japanese Patent Application No. 2016-100425 filed on May 19, 2016, Japanese Patent Application No. 2017-040422 filed on Mar. 3, 2017 and Japanese Patent Application No. 2017-041726 filed on Mar. 6, 2017 including specifications, claims and summaries are incorporated herein by reference in their entireties.

The invention claimed is:

1. An adhesive comprising a hydrolysate of a resin composition containing a thermoplastic resin (A), a copolymer (B) of ethylene and a vinyl ester and/or an acrylic acid ester having a vinyl ester and/or acrylic acid ester content higher by at least 5 mol % than (A), and a modified product having (A) grafted by (B).

2. The adhesive according to claim 1, wherein the dispersed particle size of the resin containing (A) or (B) is from 0.01 to 50 µm.

3. The adhesive according to claim 1, wherein the thermoplastic resin (A) contains at least one member of a homopolymer and a copolymer of a $C_{2-12}$ α-olefin.

4. The adhesive according to claim 1, wherein the thermoplastic resin (A) contains at least one copolymer of ethylene and a vinyl ester and/or an acrylic acid ester having a vinyl ester and/or acrylic acid ester content lower by at least 5 mol % than the copolymer (B) of ethylene and a vinyl ester and/or an acrylic acid ester.

5. The adhesive according to claim 1, wherein the copolymer (B) of ethylene and a vinyl ester and/or an acrylic acid ester has a vinyl ester and/or acrylic acid ester content of from 5 to 35 mol %.

6. The adhesive according to claim 1, which contains a crosslinking agent (C).

7. The adhesive according to claim 1, which has a vinyl alcohol content of from 0.5 to 40 mol % and a vinyl ester and/or acrylic acid ester content of at most 30 mol %.

8. An adhesive resin composition comprising the adhesive as defined in claim 1 and a polyvinyl alcohol and/or ethylene/vinyl alcohol copolymer which satisfies the following requirement (1):

(1) an ethylene content of at most 55 mol %.

9. An adhesive resin composition comprising the adhesive as defined in claim 1 and a polyolefin.

10. A laminate comprising a layer formed from the adhesive as defined in claim 1, and at least one layer formed from another material.

11. The laminate according to claim 10, wherein another material is an ethylene/vinyl alcohol copolymer.

12. The laminate according to claim 10, wherein another material is a thermoplastic resin (A).

13. A laminate comprising a layer containing an ethylene/vinyl alcohol copolymer, a layer formed from the adhesive as defined in claim 1, and a layer containing a thermoplastic resin (A), laminated in this order.

14. A laminate comprising a layer formed from the adhesive resin composition as defined in claim 8 and a layer containing a polyolefin laminated on both sides of the layer formed from the adhesive resin composition.

15. A laminate comprising a layer containing a polyvinyl alcohol and/or ethylene/vinyl alcohol copolymer and a layer containing the adhesive resin composition as defined in claim 9 laminated on both sides of the layer containing a polyvinyl alcohol and/or ethylene/vinyl alcohol copolymer.

16. A blow molded product comprising the laminate as defined in claim 10.

17. A sheet formed product comprising the laminate as defined in claim 10.

18. A film formed product comprising the laminate as defined in claim 10.

* * * * *